United States Patent [19]

Rose

[11] Patent Number: 5,533,747
[45] Date of Patent: Jul. 9, 1996

[54] AIRBAG MODULE WITH COLLAPSIBLE SIDE WALL

[75] Inventor: Larry D. Rose, Layton, Utah

[73] Assignee: Morton International, Inc., Chicago, Ill.

[21] Appl. No.: 490,975

[22] Filed: Jun. 15, 1995

[51] Int. Cl.$^6$ .................................................. B60R 21/16
[52] U.S. Cl. .............................. 280/728.2; 280/732
[58] Field of Search ....................... 280/728.1, 728.2, 280/732

[56] References Cited

U.S. PATENT DOCUMENTS

| | | | |
|---|---|---|---|
| 5,263,739 | 11/1993 | Webber et al. | 280/728 |
| 5,342,082 | 8/1994 | Kriska et al. | 280/728 A |
| 5,344,182 | 9/1994 | Lauritzen et al. | 280/728 A |
| 5,351,987 | 10/1994 | Donegan et al. | 280/728.2 |
| 5,395,133 | 3/1995 | Lauritzen et al. | 280/732 |
| 5,407,223 | 4/1995 | Lauritzen et al. | 280/728.2 |
| 5,407,226 | 4/1995 | Lauritzen et al. | 280/728 R |

FOREIGN PATENT DOCUMENTS 2-306846  12/1990  Japan .................................. 280/728.2

*Primary Examiner*—Eric D. Culbreth
*Attorney, Agent, or Firm*—George W. Rauchfuss, Jr.; Gerald K. White

[57] ABSTRACT

The side walls of an airbag module are formed separately from the main body of the module. They are attached to the main body by means of a rotatable connection and are maintained in their normal position by the module end plates. Upon receiving a compressive impact, such as through the instrument panel, the wall buckles while it rotates about the connection, thereby absorbing energy to prevent serious injury to the occupant.

18 Claims, 2 Drawing Sheets

5,533,747

AIRBAG MODULE WITH COLLAPSIBLE SIDE WALL

TECHNICAL FIELD

This invention relates to the field of automotive airbags. More particularly, it relates to a passenger-side airbag module having an enhanced ability to absorb head impact energy transmitted through the instrument panel.

BACKGROUND ART

Passenger-side airbag modules are customarily positioned behind the instrument panel in front of the location of a seated passenger. The module is normally in the form of a trough which encloses the folded airbag (or "cushion pack"). A gas generator, or inflator, is associated with the module. In the event of a crash of sufficient magnitude, a sensor activates the inflator, filling the airbag. The expanding airbag bursts through a door in the instrument panel in order to cushion the impact of the passenger's body.

Because the airbag module is mounted closely adjacent the normally flexible instrument panel, it creates the risk of a head impact injury in the event of crashes of insufficient magnitude to activate the inflator. As a result, there is in effect Federal Motor Vehicle Safety Standard 201. This standard requires that an automobile instrument panel on the passenger side properly absorbs impact energy in the head impact region. Compliance with this standard becomes more difficult in view of the placement of the airbag module which adds rigidity.

That part of the airbag module which mostly affects compliance with FMVSS 201 is the reaction canister which houses the folded airbag. This canister is normally in the form of a trough having first and second side walls interconnected by first and second end walls which enclose the folded airbag and form an open mouth adjacent the instrument panel. These walls must be strong enough to support the airbag during deployment when airbag pressures are high. Nevertheless, they must be weak enough to collapse and absorb energy upon head impact in the absence of airbag deployment. The required energy absorption of the side walls is dependent upon the instrument panel and its ability to absorb some of the energy. In some instances the instrument panel will absorb all or most of the impact energy. Under other circumstances, however, the side walls must absorb nearly all of the energy—requiring as much as 2 inches of crush or deflection to minimize deceleration forces.

Two basic types of airbag module housings are in common use, steel stamped housings and extruded aluminum housings. Steel stamped side walls are usually perforated, or formed in special ways to make them more crushable. Aluminum extruded housings are usually perforated or include special geometry making them more deformable. Extruded aluminum housings are particularly popular because they are lightweight and many structural features can be incorporated in the extrusion. Typically, extruded housings are of a one piece design including an inflator housing joined to a pair of side walls which form the trough-shaped reaction canister. End plates are added to such an extrusion to complete the module.

One problem which is introduced by such a one piece extrusion relates to wall thickness. A typical extruded housing has a minimum wall thickness of 0.090 inch. This thickness limitation is due to the size of the extruded shape and is required to maintain dimensional stability during the extrusion process. In view of this limitation, it has been necessary in the past to perforate the side walls to weaken them and allow them to be crushed more easily. This has introduced an additional step in the manufacturing process which it would be desirable to eliminate.

A second problem arises from the fact that, in certain inflator housing constructions, gas exit holes must be punched, or otherwise formed, in the inflator housing to permit gas to flow into the reaction canister to inflate the airbag. The presence of the integral rigid reaction canister side walls interferes with the tool access required to produce the gas exit holes. Furthermore, since they are rigid one piece extrusions, it is sometimes necessary to provide special restraint fixturing in order to assist in screw positioning during attachment of the end plates and mounting to the vehicle structure.

Accordingly, it is a primary object of the present invention to provide an airbag module having an improved ability to meet the required head impact safety standards. Another object is to provide such module having thinner side walls, improved tool access for forming gas exit holes, and eliminating the need for special restraint fixturing. The manner in which these and other objects are achieved will be apparent from the following description and appended claims.

DISCLOSURE OF THE INVENTION

The invention comprises an extruded aluminum inflator housing and side walls which are separately interlocked with the housing to form a reaction canister.

BEST MODE FOR CARRYING OUT THE INVENTION

Figure 1:
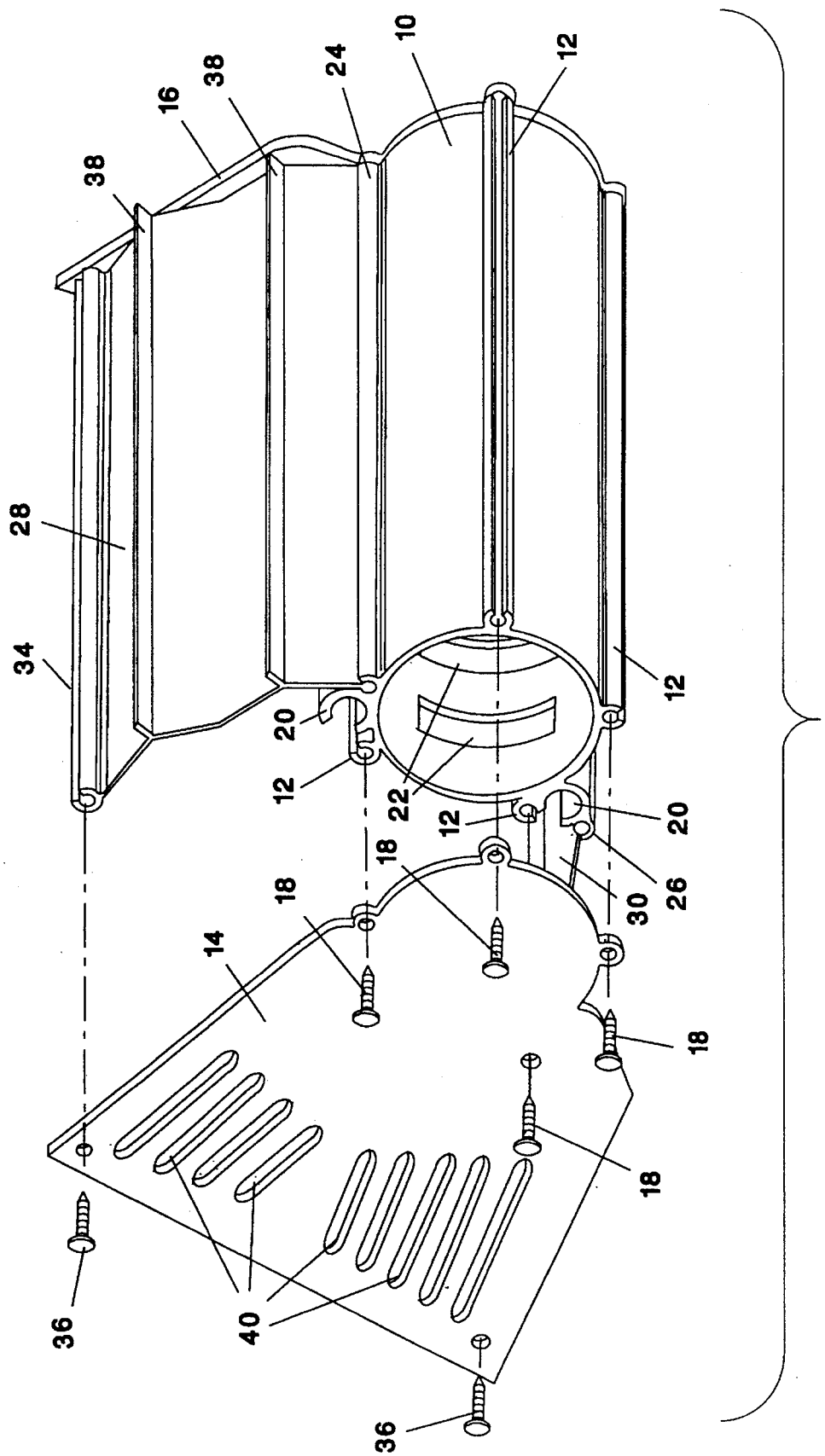
FIG. 1 is an exploded perspective view of an airbag module in accordance with the invention.

FIG. 1 illustrates a module constructed in accordance with the present invention. It comprises an extruded aluminum inflator housing 10. The inflator housing is substantially cylindrical and includes the customary screw preparations 12. These screw preparations are required for the assembly of the end plates 14, 16 by means of the screws 18. The inflator housing 10 also carries conventional groove members 20 which may be used to secure a diffuser plate and/or the edges of the airbag mouth in conventional manner. The inflator housing 10 is also provided with suitable gas exit openings 22 which allow gas from the enclosed inflator to reach the mouth of the airbag.

A unique feature of the inflator housing 10 in accordance with the present invention is the provision of elongated U-shaped pivot channels 24, 26 on substantially diametrically opposed sides of the inflator housing 10. A further unique feature of the module of this invention is the use of side walls 28, 30 which may be separately extruded and substantially thinner than the walls of the inflator housing 10. For example, in one actual embodiment, the side wall thickness was 0.050 inch as opposed to a minimum housing wall thickness of 0.090 inch. The side walls 28, 30 are substantially rectangular. Each is bounded along a bottom edge by a cylindrical bead 32 (FIG. 2) which is slidably insertable into a corresponding pivot channel 24, 26 on the inflator housing. As illustrated, the beads and channels are continuous along the length of the respective side walls and housing. However, either or both could also be discontinuous. The opposite upper edge of each side wall terminates in a generally cylindrical or U-shaped screw preparation 34 (FIG. 1). For ease of manufacturing, particularly when extruded, the screw preparations 34 run the length of the side wall. However, they could be provided only at the ends of the side wall.

The module is assembled by sliding the beads 32 of the respective side walls 28, 30 into the corresponding pivot channels 24, 26. Thereafter, the end plates 14, 16 are assembled. Screws 18 of each end plate are threaded into the screw preparations 12 on the inflator housing 10. Additional screws 36 at the upper corners of each end plate are threaded into the screw preparation 34 of the corresponding side walls. Because of the pivoting action of the beads 32 the side walls 28, 30 are easily rotated to receive the screws 36. In addition, it will be noted that, prior to the assembly of the side walls to the inflator housing, the latter is easily accessible to any tools required to form the gas exit openings 22.

Figure 2:
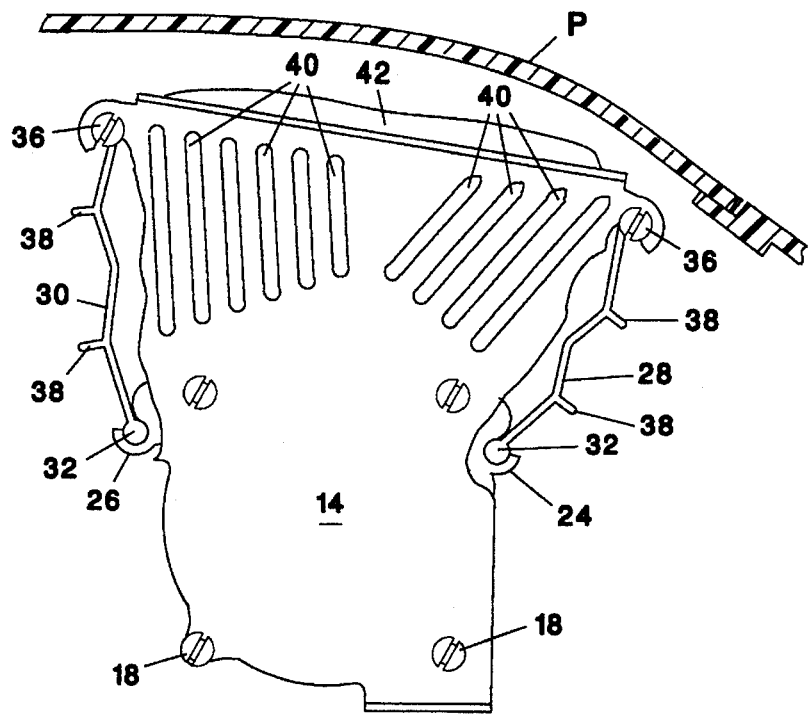
FIG. 2 is an end view of another module in accordance with the invention with portions of one end plate broken away to illustrate the internal construction.

It is the function of the side walls 28, 30 to collapse or buckle under an impact load. Accordingly, any side wall profile may be employed which is most likely to achieve this aim. As illustrated in FIG. 2, the described module includes a side wall having a somewhat zigzag shape. In addition, stiffening ribs 38 may be included to resist bowing deformation from the internal pressure of an expanding airbag without significantly affecting the desired buckling characteristics. As described herein, both side walls are collapsible. However, under many circumstances only one of the side walls needs to have such a characteristic.

In addition to making the side walls 28, 30 readily collapsible, the end plates 14, 16 may be provided with slots 40 which serve a similar weakening function.

Turning now to FIG. 2, a module in accordance with this invention is illustrated as it would be housed within a vehicle. The trough, which is defined by the side walls 28, 30 and the end plates 14, 16, encloses a folded airbag 42 which is shown protruding slightly from the mouth formed by the upper edges. The airbag module illustrated in FIG. 2 is slightly different in geometry from that illustrated in FIG. 1 but is essentially similar in its dynamic characteristics. As illustrated, it is mounted such that its open mouth and the airbag 42 are closely adjacent the instrument panel P.

Figure 3:
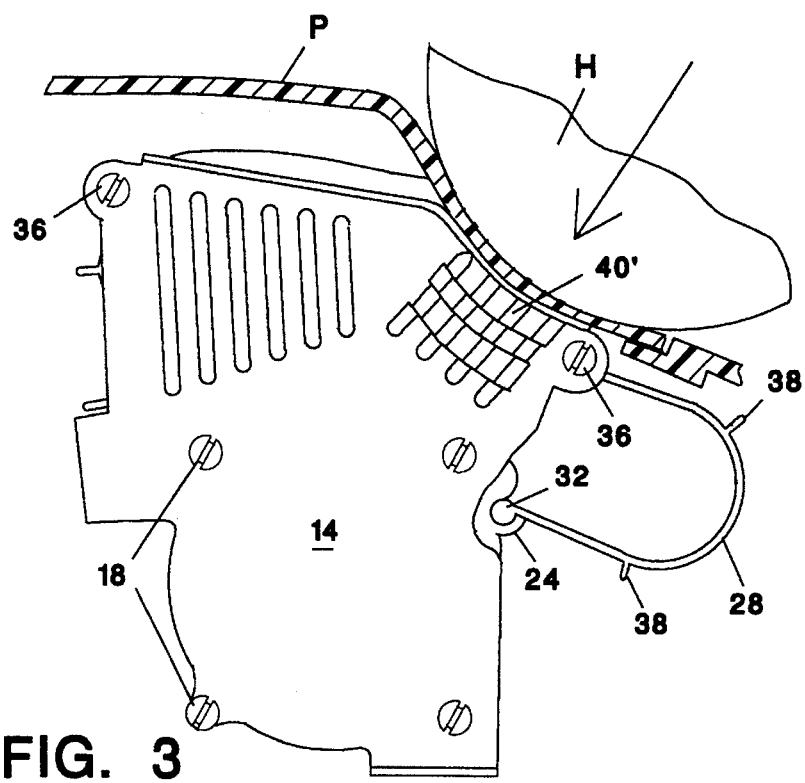
FIG. 3 is a view similar to FIG. 2 illustrating the reaction of the module to a head impact.

FIG. 3 illustrates the operation of the invention when the instrument panel P is impacted by a body member such as a head H. In this illustration, the impact is illustrated as occurring near a corner of the module so as to involve both the side wall 28 and the end plate 14. As the upper edge of the side wall 28 is driven downwardly, the screw preparation 34 rotates around the screws 36 in its opposite ends while the bead 32 along the lower edge of the side wall pivots similarly but in an opposite rotational direction within the pivot channel 24. The resulting collapse and buckling of the side wall serve to absorb the impact forces. Simultaneously, the head impact against the end plate 14 causes end plate buckling within the weakened portion including the collapsed slots 40'.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In a motor vehicle airbag module including an inflator housing and a trough-shaped reaction canister having first and second substantially rectangular side walls joined by first and second end walls to define an open mouth, said reaction canister being adapted to enclose an airbag inflatable with gas from said inflator housing, the improvement wherein at least one of said side walls is deformable and comprises:

a first edge rotatably engageable with said inflator housing; and a second edge bounding said open mouth and rotatably engageable with said first and second end walls, whereby a compressive impact to said second edge will deformably collapse said one side wall, accompanied by rotation of said first and second edges.

2. The improvement of claim 1 wherein one of said inflator housing and first edge defines a channel and the other defines a bead engageable within said channel.

3. The improvement of claim 2 wherein said channel is defined by said inflator housing and said first edge defines said bead.

4. The improvement of claim 3 wherein said bead is substantially continuous along said first edge.

5. The improvement of claim 4 wherein said second edge defines an opening adjacent said first end wall and fastener means extends from said first end wall into, and rotatably engages, said opening.

6. The improvement of claim 5 wherein said opening is a screw preparation and said fastener means is a screw.

7. The improvement of claim 1 wherein said one side wall includes stiffening ribs to prevent bowing during airbag inflation.

8. The improvement of claim 1 wherein at least one of said end walls is collapsible.

9. The improvement of claim 8 wherein said collapsible end wall is perforated.

10. The improvement of claim 1 wherein said second edge defines an opening adjacent said first end wall and fastener means extends from said first end wall into, and rotatably engages, said opening.

11. The improvement of claim 10 wherein said opening is a screw preparation and said fastener means is a screw.

12. In a motor vehicle airbag module including an inflator housing and a trough-shaped reaction canister having first and second substantially rectangular side walls joined by first and second end walls to define an open mouth, said reaction canister being adapted to enclose an airbag inflatable with gas from said inflator housing, the improvement wherein both of said side walls are deformable and each side wall comprises:

a first edge rotatably engageable with said inflator housing; and a second edge bounding said open mouth and rotatably engageable with said first and second end walls, whereby a compressive impact to said second edge will deformably collapse said side wall, accompanied by rotation of said first and second edges.

13. The improvement of claim 12 wherein the inflator housing defines a channel and the first edge defines a bead engageable within said channel.

14. The improvement of claim 13 wherein said bead is substantially continuous along said first edge.

15. The improvement of claim 12 wherein said side walls include stiffening ribs to prevent bowing during airbag inflation.

16. The improvement of claim 12 wherein said end walls are collapsible.

17. A motor vehicle airbag module comprising:

a substantially cylindrical inflator housing having first and second ends and first and second channels thereon positioned on opposite external sides of said housing;

a first side wall of substantially rectangular configuration having a bead along one edge received in said first channel and a substantially cylindrical screw preparation along an opposite edge;

a second side wall of substantially rectangular configuration having a bead along one edge received in said second channel and a substantially cylindrical screw preparation along an opposite edge;

a first end plate secured to the first end of said inflator housing and including means for rotatably engaging said screw preparations on each of said first and second side walls; and a second end plate secured to the second end of said inflator housing and including means for rotatably engaging said screw preparations on each of said first and second side walls.

18. A motor vehicle airbag module of claim 17 wherein said channels are substantially continuous longitudinally along said cylindrical inflator housing, said beads are substantially continuous longitudinally along said one edge of said first and second side walls, said side walls each include stiffening ribs to prevent bowing of the side walls during inflation of an airbag, and said first and second end plates and said first and second side walls are deformably collapsible upon receiving a compressive impact thereto.

* * * * *